Oct. 6, 1953  W. H. MARSHALL, JR  2,654,788
NITRATION OF ORGANIC COMPOUNDS
Original Filed April 2, 1948
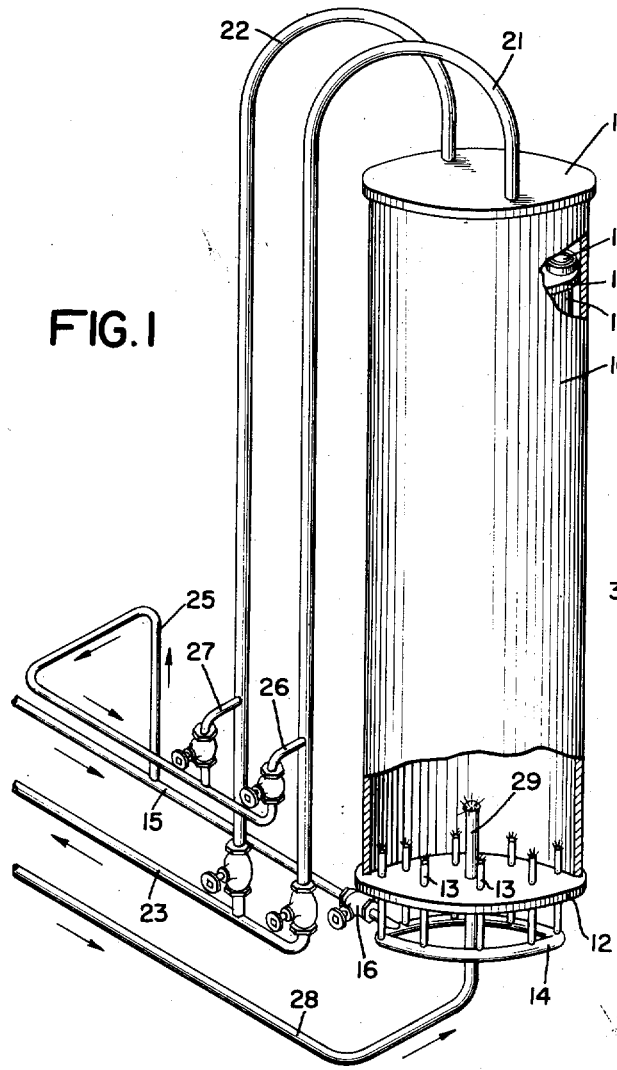
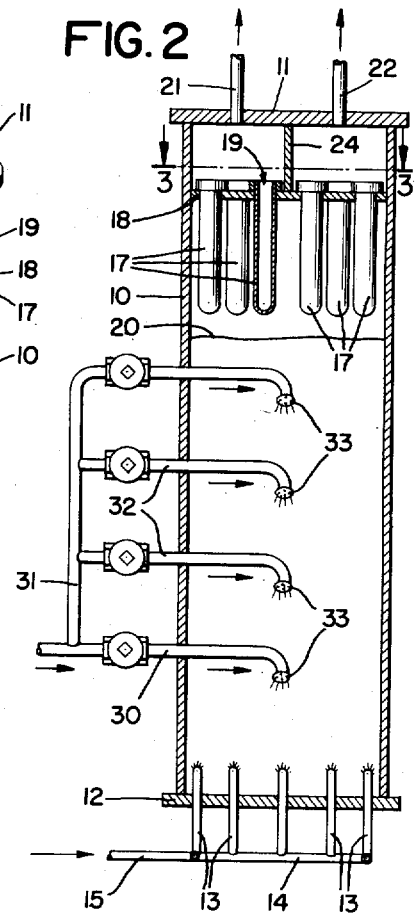
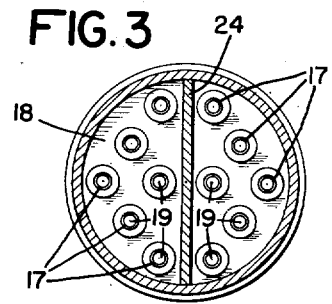
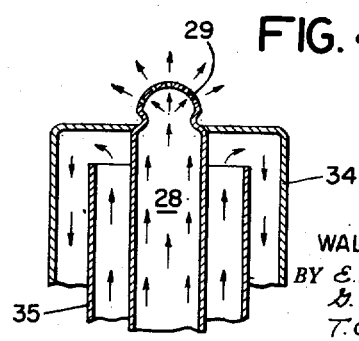
*INVENTOR.*
WALTON H. MARSHALL JR.
BY E. F. Liebrecht
G. H. Palmer
T. C. Virgil
ATTORNEY.

Patented Oct. 6, 1953

2,654,788

UNITED STATES PATENT OFFICE 2,654,788

NITRATION OF ORGANIC COMPOUNDS

Walton H. Marshall, Jr., Bronxville, N. Y., assignor to The M. W. Kellogg Company, Jersey City, N. J., a corporation of Delaware Original application April 2, 1948, Serial No. 18,607. Divided and this application July 25, 1951, Serial No. 238,559

9 Claims. (Cl. 260—644)

This application is a division of application Serial No. 18,607, filed April 2, 1948.

This invention relates to an improved method for nitrating organic compounds. More particularly the invention relates to an improved method for nitrating hydrocarbons or mixtures of hydrocarbons, whether paraffinic, olefinic, acetylenic, aromatic, or naphthenic, and other organic compounds such as alcohols, aldehydes, acids, halogenated derivatives, etc. The hydrocarbons to which the improved process is particularly applicable are propane and benzene.

In the nitration of propane, vapors of nitric acid and propane are contacted at elevated temperature and pressure to bring about a reaction which results in the formation of nitroparaffins, with some alcohols, acids, etc., as oxidation byproducts. The reaction proceeds without the use of a catalyst in a temperature range of approximately 250° C. to 450° C. The pressure normally used is 200-250 pounds per square inch. In this operation an important technical problem is presented by the necessity for vaporizing nitric acid. The hot nitric acid about to become vaporized is highly corrosive to metal surfaces. Vessels made of special cast iron alloys are capable of withstanding such corrosive conditions, but such vessels are quite brittle and susceptible to breakage because of thermal shock. Such brittleness substantially precludes the use of relatively large evaporating vessels made of these materials.

It is an object of my invention to provide an improved process for nitrating organic compounds, according to which the nitric acid is vaporized without contact of the liquid acid with the walls of any metal container. It is a further object of my invention to provide an improved process in which the heat required to vaporize the nitric acid is supplied largely by the heat of the nitration reaction. Other objects of my invention are apparent from the following more detailed description.

In accordance with my improved process, the cool relatively non-corrosive liquid nitric acid is sprayed into a dense bed of finely divided suspended solids, not reactive with the hot acid, which are at a temperature such that the nitric acid vaporizes substantially instantaneously upon contact of the liquid with the hot solids. The vapors thus formed are substantially immediately contacted in the same zone with vapors of the organic compound to be nitrated.

The finely divided solid heat-containing material preferably is maintained as a substantially dense fluidized mass by the passage of aerating gases or vapors upwardly therethrough at a suitable velocity. However, the invention is not limited to an operation in which the solid heat-containing material is maintained in this condition, but includes within its scope the step of vaporizing nitric acid by contacting the nitric acid liquid with hot finely divided solids under any condition of concentration or density in which the quantity of solids and the heat content thereof are sufficient to effect the desired substantially instantaneous vaporization of the nitric acid.

Any suitable gas or vapor may be employed to agitate and suspend a mass of hot solids, for example the nitric acid vapors formed by contact with the hot solids may serve as the aerating and agitating medium. However, it is preferable to employ the vapors of the organic compound to be nitrated. This provides more positive agitation of the mass of solids and facilitates prompt reaction of the nitric acid vapor with the organic compounds to be nitrated. Furthermore, this method of aerating the hot solids permits the use of heat contained therein to preheat the organic reactant. However, any other suitable gas or vapor may be employed to aerate or agitate the mass of solids.

It is preferable to maintain the hot solids in the vaporizing zone in a condition of high concentration and turbulence which is characteristic of masses of finely divided solids aerated by the passage of gas or vapor upwardly therethrough at relatively low linear velocity. The organic reactant also is introduced into the vaporizing zone and the heat of the resulting reaction of the nitric acid and the organic compound is largely absorbed by the aerated mass of solids. The heat of reaction absorbed by the solid particle from the reaction occurring on or adjacent to its surface is subsequently utilized for vaporizing the nitric acid when the solids particle is brought into contact with liquid nitric acid which is continuously introduced into the vaporizing zone. In accordance with this method of operation nitric acid may be vaporized out of contact with any metal surfaces subject to corrosion, and the reaction of the organic compound and nitric acid vapor in contact with the solid particles employed to effect vaporization effects the transfer of heat of reaction to the vaporizing step, thus providing the heat of vaporization and withdrawing the heat of reaction from the reaction zone.

The invention will be described in more detail by reference to the drawings, which illustrate arrangements of apparatus for carrying out the improved process of the invention. Fig. 1 is an isometric view, with portions broken away, of a suitable reactor, and necessary connections, for carrying out the improved process. Fig. 2 is a cross-sectional view in elevation of a similar reactor illustrating a modified method of introducing reactants. Fig. 3 is a cross-section of the upper part of the reactor of Fig. 2 at line 3—3. Fig. 4 is a detail of a suitable nozzle for spraying liquid nitric acid into contact with the finely divided solids.

In Fig. 1 a combined vaporizing and reaction zone is provided in vessel 10, which conveniently is a cylindrical, substantially vertically elongated vessel, having a cylindrical side wall, and top and bottom walls 11 and 12. Vessel 10 is adapted to contain a mass of finely divided solids which is maintained in an aerated condition by the introduction of the vaporized organic compound, such as propane. The introduction of the aerating fluid may be effected in any manner which provides adequate aeration of the mass of solids. Conveniently the vapors, such as propane, are introduced into the bottom of vessel 10 through a plurality of relatively small inlet lines 13, which extend through the bottom 12 of vessel 10 and connect with an outside manifold 14. Manifold 14 is supplied with the propane, or other vapor, by line 15, which is provided with valve 16. The vaporized organic compound to be nitrated preferably is introduced to the reaction zone through line 15 in a preheated condition in order to supply a part of the heat necessary to maintain the vapors in the reaction zone at the desired temperature level. Consequently, line 15 connects with a suitable source (not shown) of preheated vapors of the organic compound to be nitrated.

In the preferred modification of the invention illustrated in Fig. 1, the mass of finely divided solids is maintained in a relatively dense condition by flowing the various aerating vapors upwardly therethrough at relatively low linear velocities. In this condition the particles circulate through the mass at a high rate which provides efficient heat transfer between the points of vaporization and the points of reaction. The invention includes within its scope passage of the reactants through the vaporizing and reaction zone at a wide range of linear velocities, such as 0.1 to 50 feet per second. In the modification illustrated in Fig. 1, however, it is preferred to limit the velocity to maintain the aerated solids as a relatively dense mass which exhibits the appearance of a boiling liquid and thus may be said to be fluidized. The exact linear velocities necessary to maintain this preferred condition depend upon the character of the solids. In general the preferred range of linear velocities is approximately .5 to 6 feet per second. Higher velocities in this range may be employed in connection with solids of greater density and/or particle size.

The volume of the fluidized bed of solids maintained in the reactor, and the size of the reactor, are arranged to provide a suitable space in the upper part of the reactor for means for filtering out finely divided solids from the reactants about to pass out of the reaction zone. It is convenient to install such separating means in the reactor, although separation of entrained solids from the reaction vapors after passage of the latter out of the reactor is not excluded from the scope of the invention. Any suitable means may be employed for separating entrained solids from the vapors. Such means include filters, centrifugal separators, etc., and the invention is not limited to any special means for separating entrained catalyst. Figs. 1 and 2 illustrate the separation of entrained solids from the outgoing reaction vapors by means of a plurality of filters 17. These may be constructed of porous ceramic or metallic material, in the well known manner. They are supported on an interior closure member 18 and are closed at the bottom and open at the top, as indicated at 19. The fluidized mass of solids in reactor 10 rises to a level indicated at 20 below the filters 17. The reaction vapors carrying entrained finely divided solids flow through the mass and into the porous surfaces of the filters 17. The entrained solids are separated from the gas or vapor at the outer surface of the filters and either fall back onto the fluidized mass of solids or are retained on the filter surface. The reaction products, denuded of solids, emerge from the open ends of the filters 17 and pass out of the reactor through either of exit lines 21 or 22, which connect with line 23. The reaction products pass through line 23 to suitable means, not shown, for recovering reaction products.

Alternate drawoff lines 21 and 22 are provided to permit clearing the filters by intermittently reversing the flow of gas therethrough. For this purpose the portion of the reactor above closure 18 is divided by a vertical partition 24 whereby gases may be flowed downwardly through half of the filters 17 and into the reactor while the reaction products and the "blow-back" vapors are passing out through the other filters. The blow-back vapors conveniently may be supplied by diverting a portion of the preheated vaporized organic compound being supplied to the process through line 15. For this purpose line 25 is provided to connect line 15, at 26 and 27, with lines 21 and 22, respectively.

In accordance with the modification illustrated in Fig. 1, the cold nitric acid is supplied to the process through line 28 which passes through the bottom 12 of reactor 10 and terminates in a suitable spray nozzle 29. It may be desirable to introduce the liquid nitric acid into reactor 10 through nozzle 29 at a greater distance from the bottom of reactor 10 than is desirable for introduction of the vaporized hydrocarbon reactant from nozzles 13, in order to avoid contacting the metallic bottom wall of vessel 10 with unvaporized nitric acid. This permits rapid circulation of hot solids on all sides of the exit of nozzle 29 whereby the nitric acid is substantially completely vaporized without contact of liquid nitric acid with the side or bottom of the reactor.

Fig. 2 illustrates a different method of introducing the liquid nitric acid into the reactor. In the arrangement of Fig. 2 the bottom inlet line 28 for nitric acid is dispensed with and the acid is introduced at one or more points higher up in the reactor by means of lines 30 and 31 and intermediate connections 32, each of which is provided with a suitable spray nozzle 33. Conveniently these spray nozzles 33 may be turned downwardly as shown in Fig. 2, whereby the nitric acid is sprayed against the upflowing stream of vapors of the organic reactant, in order to obtain the greatest efficiency of mixing and distribution of the reactants and acid.

Fig. 2 represents a cross-sectional view in elevation of the reactor of Fig. 1, except for the different connections for introducing nitric acid. Consequently, similar parts having similar functions in Fig. 1 and Fig. 2 have been indicated by the same reference numerals.

In the modification shown in Fig. 2, the liquid nitric acid may be introduced at one or more different elevations in the reactor through spray nozzles 33. By introducing the liquid acid at a plurality of such elevations the vaporization of the acid is distributed over a greater part of the reaction zone whereby the removal of the heat of reaction is more uniform. However, it may be advantageous to introduce all of the acid at any one of the four different elevations provided for in Fig. 2 whereby there is a substantial distance between the point of introduction of the vaporized hydrocarbons and the point of vaporization of the nitric acid.

The lines leading to the acid spray nozzles may be in contact, for substantial length therof, with the fluidized mass of hot solids, whereby the acid may tend to be heated during passage therethrough to a temperature which would cause substantial corrosion of the nozzle and connecting lines. To avoid this effect suitable means may be provided for cooling the acid line leading through the fluidized mass of solids to the exit nozzle. Such means are illustrated in Fig. 4 as applied to line 28 and nozzle 29. As shown in Fig. 4, that part of pipe 28 leading to nozzle 29 and in contact with hot catalyst may be enclosed within an outer cylindrical casing 34 which is closed at the end adjacent nozzle 29. Cooling liquid may be circulated adjacent pipe 28 inside casing 34. To provide for more positive circulation of such cooling liquid an internal cylindrical member 35, concentric with pipe 28 and member 34, may be provided. Thus a suitable cooling fluid may be circulated toward nozzle 29 through the annulus between pipe 28 and member 35, and back to the source of supply through the annulus between members 34 and 35. In this manner the nitric acid may be maintained at temperatures sufficiently low to prevent corrosion prior to its emergence from nozzle 29, or any other suitable distributor.

The nitric acid may be supplied to the reaction zone in any desired concentration or purity. In certain cases, where oxygenated derivatives are desired, $NO_2$ may be used as an oxygen carrier.

The nitric acid and reactants ordinarily are introduced into the reaction zone in a ratio which depends upon the reaction conditions and the nature of the materials used. In general, however, the quantity of hydrocarbon or organic reactant used is in excess of the stoichiometric amount which is necessary for the reaction. The following equation illustrates the nitration of propane, with respect to the relative molar quantities of reactants which are necessary for the reaction.

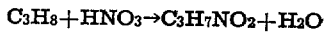

$$C_3H_8 + HNO_3 \rightarrow C_3H_7NO_2 + H_2O$$

The finely divided solid which is primarily a heat transfer agent need not exert any catalytic action, although it may be desired to employ a material which has a catalytic effect on the reaction, depending upon the particular organic compound to be nitrated. The finely divided solid material may be of any particle size which permits it to be suspended or agitated or fluidized in the contact zone. Ordinarily material having a range of particle sizes falling entirely or largely within the range of 5 to 500 microns may be employed with advantage. The linear velocity of the aerating gases in the contact zone and the particle size ordinarily should be such that the solids shall be present in the contact zone in a density of 5 to 40 pounds per cubic foot. The invention is not limited to this condition, however, and it is operable under conditions in which the solid is present in the contact zone in lesser or greater density.

Any suitable, sufficiently inert, material may be employed as the finely divided contact material. Such materials may include sand, glass, and carbon, of the proper particle size, as well as nitrates which are stable under the conditions of operation, such as barium nitrate. Other materials having a catalytic effect may be substituted for the above-named contact materials, or the above-named contact materials may be impregnated, or otherwise associated, with small amounts of catalyst for the nitration reaction.

The temperature and pressure employed in the reaction zone ordinarily correspond to those employed in previous nitration processes, and depend upon the characteristics of the particular organic compound to be nitrated. For the nitration of paraffins the operating pressures range from atmospheric to approximately 500 pounds per square inch and temperatures range from 300° F. to 900° F. Similarly the reaction time and/or space velocity varies according to the particular reaction and the nature of the solid employed as the contact agent.

The modifications of the invention described above in connection with the drawing indicate the maintenance of a body of contact material in a contact chamber. The invention is not limited to such operations, however, and it may be desirable to introduce or withdraw solids from the contact vessel in any convenient manner in order to circulate the solids through other pieces of equipment in order to cool or heat the solids, or in order to regenerate catalytic activity.

The temperature of the reaction may be controlled in any convenient manner, such as by adjusting the temperature of the stream of organic compound fed to the reaction chamber, by controlling the ratio of recycling of unconverted reactants, and by heating or cooling the finely divided contact material, as by means of heating or cooling tubes in the contact chamber.

I claim:

1. In the process for reacting nitric acid with a hydrocarbon in the vapor phase to produce a nitrated hydrocarbon as the principal product, the method of operating the process to decrease the corrosive effects of liquid nitric acid which comprises contacting liquid nitric acid with a mass of finely divided solid material in a quantity and at a temperature sufficient to effect complete vaporization thereof, and then reacting the nitric acid vapor thus produced with the hydrocarbon reactant.

2. The method of claim 1 wherein the hydrocarbon is a paraffinic hydrocarbon.

3. The method of claim 1 wherein the hydrocarbon is propane.

4. The method of claim 1 wherein the hydrocarbon is benzene.

5. In the process for reacting nitric acid with a hydrocarbon in the vapor phase to produce a nitrated hydrocarbon as the principal product, the method of operating the process to decrease the corrosive effects of liquid nitric acid and to utilize the heat of nitration for vaporizing the liquid nitric acid which comprises introducing liquid nitric acid into a hot mass of finely divided solid material in a quantity and at a temperature sufficient to vaporize the liquid nitric acid, and contacting the nitric acid vapor thus produced with the hydrocarbon reactant in the presence of the finely divided material whereby the heat of nitration is absorbed by the solids for utilization in vaporizing additional quantities of liquid nitric acid.

6. In the process for continuously reacting nitric acid with a hydrocarbon in the vapor phase to produce a nitrated hydrocarbon as the principal product, the method of operating the process to decrease the corrosive effects of liquid nitric acid and to utilize the heat of nitration to maintain the desired reaction temperature which comprises passing a continuous stream of liquid nitric acid into a hot mass of finely divided solid material which is present in the reaction zone in a quantity and at a temperature sufficient to vaporize completely the liquid acid, and introducing into said reaction zone a continuous stream of hydrocarbon to react with the nitric acid in the vapor phase, thus the heat of nitration is absorbed by the finely divided solid material and is utilized for maintaining the desired reaction temperature.

7. In the process for reacting nitric acid with a hydrocarbon in the vapor phase to produce a nitrated hydrocarbon as the principal product, the method of operating the process to decrease the corrosive effects of liquid nitric acid and to utilize the heat of nitration for maintaining the desired reaction temperature which comprises introducing liquid nitric acid into a mass of hot finely divided solid material in a quantity and at a temperature sufficient to vaporize the liquid acid, reacting the nitric acid and the hydrocarbon reactant in the vapor phase in the presence of the said finely divided solid material in order to absorb the heat of nitration and utilize same for maintaining the desired reaction temperature and heating the finely divided solids to maintain the desired temperature level thereof for the vaporization of the incoming liquid nitric acid.

8. The method of reacting nitric acid with a hydrocarbon in the vapor phase which comprises passing a stream of hydrocarbon vapor upwardly through a mass of finely divided solid material at a superficial linear velocity sufficient to maintain the solid material in a dense fluidized condition, maintaining the dense fluidized mass of solids at the desired reaction temperature level, continuously introducing liquid nitric acid into the fluidized mass of solids at a rate such that the acid is completely vaporized by the hot mass of finely divided solids, and maintaining the resultant nitric acid vapors in contact with the hydrocarbon vapor in the presence of the finely divided solid material in order that the heat of nitration is absorbed by the solids and is utilized for maintaining the same at the desired reaction temperature level for the further vaporization of the incoming liquid nitric acid.

9. The process of claim 8 wherein the hydrocarbon vapor is preheated at a temperature sufficient to maintain the desired reaction temperature level.

WALTON H. MARSHALL, Jr.

References Cited in the file of this patent

UNITED STATES PATENTS

| Number | Name | Date |
|---|---|---|
| 2,260,258 | Martin | Oct. 21, 1941 |
| 2,418,241 | Stengel | Apr. 1, 1947 |
| 2,512,587 | Stengel | June 20, 1950 |